United States Patent [19]

Kim et al.

[11] Patent Number: 5,298,216
[45] Date of Patent: Mar. 29, 1994

[54] METHOD FOR MOLDING A TIRE TREAD BY INJECTION

[75] Inventors: Chun-Sik Kim; Jong-Dae Han; Gyoeng-Su Kim, all of Kwangju, Rep. of Korea

[73] Assignee: Kumho & Co., Inc., Seoul, Rep. of Korea

[21] Appl. No.: 899,680

[22] Filed: Jun. 17, 1992

[30] Foreign Application Priority Data

Jun. 26, 1991 [KR] Rep. of Korea ............ 10716/1991

[51] Int. Cl.$^5$ .................. B29C 45/14; B29D 30/22
[52] U.S. Cl. .................. 264/249; 156/125; 264/259; 264/250; 264/328.3; 264/314; 425/543
[58] Field of Search .............. 156/125, 128.1; 264/250, 502, 328.3, 328.2, 248, 249, 314; 425/543, 544

[56] References Cited

U.S. PATENT DOCUMENTS 2,724,425 11/1955 Ostling .................. 264/328.3
4,055,619 10/1977 Goodfellow .................. 264/328.3
5,024,800 6/1991 Schmidt et al. .................. 264/502

FOREIGN PATENT DOCUMENTS 58-25949 2/1983 Japan .................. 264/328.3

Primary Examiner—Jeffery Thurlow
Assistant Examiner—Mathieu Vargot
Attorney, Agent, or Firm—Lowe, Price, LeBlanc & Becker

[57] ABSTRACT

A method for molding a tire tread element by injecting a rubber mixture through injection holes of an injection mold formed by moving two cooperating mold elements toward a cylindrical drum disposed therebetween. The mold elements sealingly match to an outer surface of the inflatable drum to define a mold cavity of a cross-section and length selected to form a tread element of precisely defined shape and size. A breaker layer may be integrated with an injected rubber mixture and the tread element may be made to be completely circular or linear with matchingly formed end surfaces enabling secure adherence thereat.

15 Claims, 3 Drawing Sheets

FIG. 1
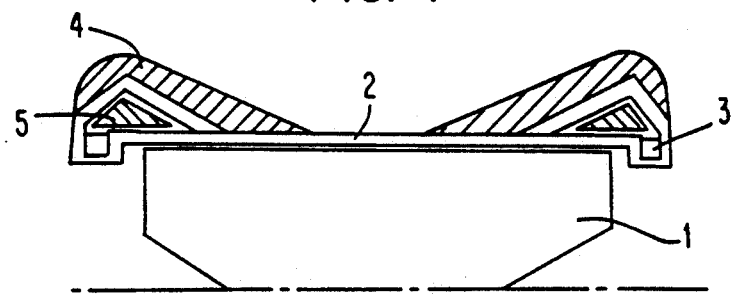
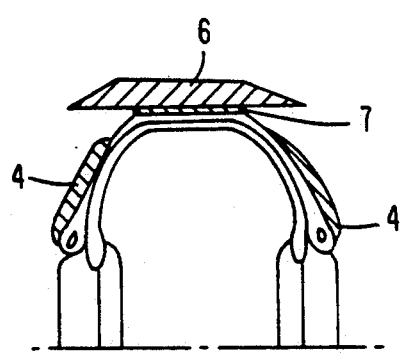
FIG. 2(a)
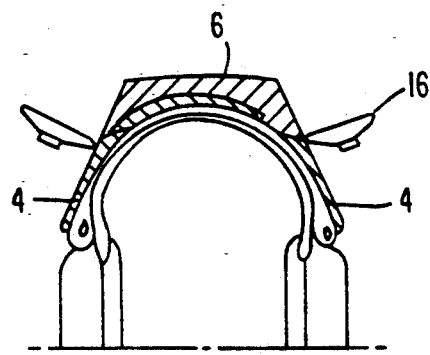
FIG. 2(b)
FIG. 3

METHOD FOR MOLDING A TIRE TREAD BY INJECTION

FIELD OF THE INVENTION

The present invention relates to a method for manufacturing a tread for a radial tire by high pressure injection molding.

BACKGROUND OF THE PRIOR ART

Generally, the procedure for molding a radial tire involves manufacturing a green tire, i.e., a tire before to be subjected to a curing process, which consists of first and the second steps.

The first step is that an inner layer, a carcass layer, a bead, an apex layer and a sidewall layer are assembled on a cylindrical drum to form the first case as shown in FIG. 1. The second step is that said case manufactured by said first step is shaped to the same type as nearly completed product, and a breaker layer and a tread layer are adhered, in turn, to said carcass layer as shown in FIG. 2(a).

Then, as shown in FIG. 2(b), said breaker layer and tread layer are adhered completely by pressing of a stiching roller thereto to complete forming of shape of a green case. Said tread being used in the second step is obtained by extruding a shape as shown in FIG. 3, by a conventional extrusion process, and then cutting the resulting product with a knife. Said tread is cut in bias manner as shown in FIG. 4, in order to maximize an area of end contact when the tread is adhered along the circumference of a circle in the second step of the molding procedure.

However, after the extrusion molding, both ends of the tread cut by the knife cannot readily be placed at a bias angle sufficient to extend the contact area of both ends of the tread.

Furthermore, in the conventional radial tire, the proportional weight of the tread is also very high, wherein it has a range of 30~40% per total tire weight, and thus it exerts an important effect on uniformity and balance of the final tire.

A method for manufacturing the conventional tread will be described with reference to the accompanying drawings.

Referring to FIG. 1, tire components are assembled on a cylindrical drum in the first molding step for manufacturing a conventional tire. The first case thus defined is one in which an inner liner layer, a carcass layer (2), a bead(3), an apex(5) and a sidewall(4) are assembled on the cylindrical drum(1).

FIG. 2(a) illustrates the second molding step, wherein said first case is shaped in a form similar to the completed tire wherein a breaker layer(7) is adhered on said carcass layer and then a tread(6) is adhered on said breaker layer(7). FIG. 2(b) shows that after the second type said breaker layer(7) and tread layer(6) are adhered completely by the pressing of a stiching roller(16) to form a completed green tire.

FIGS. 3, 4 show perspective and sectional views of a tread element (6) cut in regular lengths after extrusion of the tread by the conventional method.

However, as mentioned above, since the tread shaped by a conventional molding process and cut by a knife generally has a low rubber contractile rate and low precision in cutting, its requisite length and cutting cannot readily be obtained in the second molding step.

Due to the above-mentioned reasons, when the tread is assembled in the second step, it is adhered by extending or reducing its length little by little as required depending upon the original length.

Accordingly, the tread sectional profile and its weight distribution along a circumference of the tread are not uniform.

Uneven sectional profile and weight of the tread exert an important effect on uniformity and balance of the final product because the tread has a high weight ratio relative to the whole tire. Furthermore, if adhesive force in the tread is lowered across its section or alien substances penetrate, they cause tire disintegration within a short period of time.

Furthermore, an extruder for manufacturing a tread being utilized in the prior extruding method has a large volume, and requires auxilliary equipment such as facilities for a cooling, cutting, preservation and the like, passing through a conveyer system after extrusion.

Accordingly, it occupies a large space as well as a cost price increase, and maintenance and repair also are difficult.

The present invention solves the defects of the conventional molding method employing the method described above.

SUMMARY OF THE PRESENT INVENTION

It is an objective of the present invention to provide for manufacturing a tire tread is by high pressing injection molding.

Referring to the accompanying drawings, the present invention relates to a method for manufacturing a tread element, which is molded with a rubber composition by high pressing injection.

The mold for injection used in the present invention has a cavity of requisite shape identical to a section shape and length of said tread being manufactured by the conventional extruding method.

More particularly, in the present invention, a two piece mold formed of upper and the lower molds (13), (14) respectively, is used in the injection molding process.

It is an objective according to a preferred embodiment of the present invention that the whole shape of the tread element molded by said injection mold be identical to that molded by the conventional extrusion method, and both ends of the tread be the selected inclined angle($\alpha$) as shown in FIGS. 6(a) and (b) in order to enhance adhesive force between the two ends in the second molding step.

Furthermore, it is another objective according to another embodiment of the present invention that the injection mold have a cavity(11) of the same shape as that of said tread element molded inside thereof and have a diameter identical with the surface of an inflated drum(10).

In addition, it is another objective of the present invention that a breaker layer(7) and a tread layer(15) be molded together or that only the tread element be molded.

More particularly, it is an objective of the present invention that the breaker layer(7) may be or may not be adhered on an inflated drum, said molds(13)(14) be engaged thereon, and a rubber mixture be injected into an infusion hole of the rubber mixture for the tread to mold the breaker layer(7) and the tread (15).

As described above, the tread molded by the method of the present invention has a characteristic that can be controlled to lower or raise the inclined cutting angle(α) of both ends depending upon the type of mold used.

BRIEF DESCRIPTION OF THE DRAWING

FIG. 1 is a sectional view of a state in which tire members are assembled on a drum for molding in a known process.

FIG. 2(a) is a sectional view before completion of a green tire shape in a known process.

FIG. 2(b) is a sectional view after completion of a green tire shape in a known process.

FIG. 3 is a sectional view of a tread element.

Description of the Preferred Embodiments

The present invention relates to a method for manufacturing a tread element that combines a rubber layer(15) and/or a breaker layer(7) of a tire by injection molding.

More particularly, the method according to the present invention involves using a cylindrical drum(10) capable of inflating and being deflated radially and also uses a breaker layer(7) in which one to six layers of steel cords are disposed at a selected angle in curable rubber and are cut in a selected width.

Figure 7:
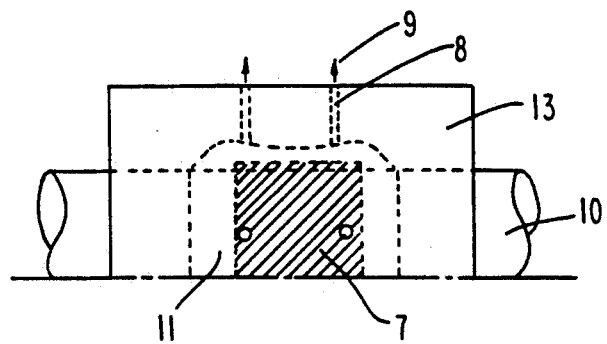
FIG. 7 is a partial upper sectional view wherein the breaker layer is adhered on the drum and the upper mold is assembled thereon.
Figure 8:
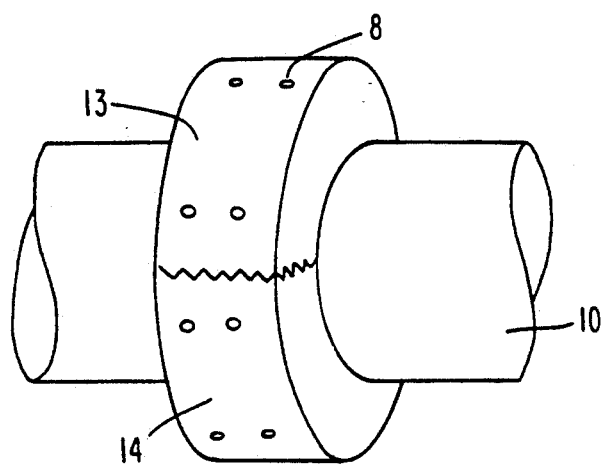
FIG. 8 is a perspective view of a sate in which the upper and the lower molds are assembled on a cylindrical drum.

As shown in FIG. 7, in one embodiment said breaker layer(7) is adhered along a circumference of said inflated cylindrical drum(10) as shown in FIG. 8, the annular cylindrical mold having an inside diameter "D" identical with that of the outside surface of said inflated drum(10) is assembled onto the breaker layer(7) on the drum so as to cover it completely, and then the rubber mixture for the tread is injected through an injection hole (8) to mold the tread rubber layer(15).

In the above-mentioned injection molding process, the inside diameter curved surfaces of said upper and lower molds 13, 14 should be identical with the outside surface diameter "D" of said inflated drum (10) where they make contact so that the rubber mixture injected through a nozzle of the assembled mold does not flow out from the mold, whereby loss of the pressure provided inside the mold also is prevented. See FIGS. 7 and 8.

Optionally, according to another embodiment, without the breaker layer(7), the tread rubber layer(15) above may be molded by injection.

The complete mold consists of two pieces, i.e., the upper mold(13) and the lower mold(14) best seen in perspective view in FIG. 8, which move toward each other from opposite sides to engage to the cylindrical drum 10 therebetween. In other words, the mold sections 13 and 14 are moved toward axis X—X of the cylindrical drum 10 to coact with its outer surface.

The injection hole(8) for injection of the rubber mixture into the mold typically is bored vertically from the surface of the mold so as to enable injection said rubber mixture into the injection mold through a nozzle(9).

The number of injection holes(8) for the rubber mixture may be from 4~40 depending upon the mold cavity, and the injection hole diameter is preferably 3 mm. FIG. 8 shows the upper and lower molds (13)(14) assembled with respect to each other on the inflated drum(10). Also the infusion holes(8) for the rubber mixture are shown, but the conventional cylinder filled with the rubber mixture and a piston pressing said mixture which are connected with the infusion hole(8) of the mold as shown in FIG. 7 for passing the rubber mixture through the nozzle (9) are not shown for simplicity.

The rubber mixture is injected into the cavity(11) of the mold through the nozzle (9) via injection hole (8) from a known cylinder by pressing a piston (not shown).

Figure 9:
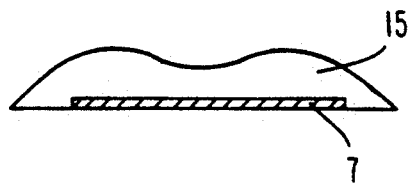
FIG. 9 is a sectional view of the tread material and the breaker molded with a breaker layer and a rubber mixture.

After an appropriate time lapse, the shape, as shown cross-sectionally in FIG. 9, is stably obtained. Then the upper mold(13) and the lower mold(14) are moved upward and downward, respectively. Then the inflated cylindrical drum(10) is deflated to obtain the tread element in which the breaker layer(7) and the tread rubber layer(15) are combined. The resulting tread element is used in the second step of the conventional tire making process.

Figure 4:
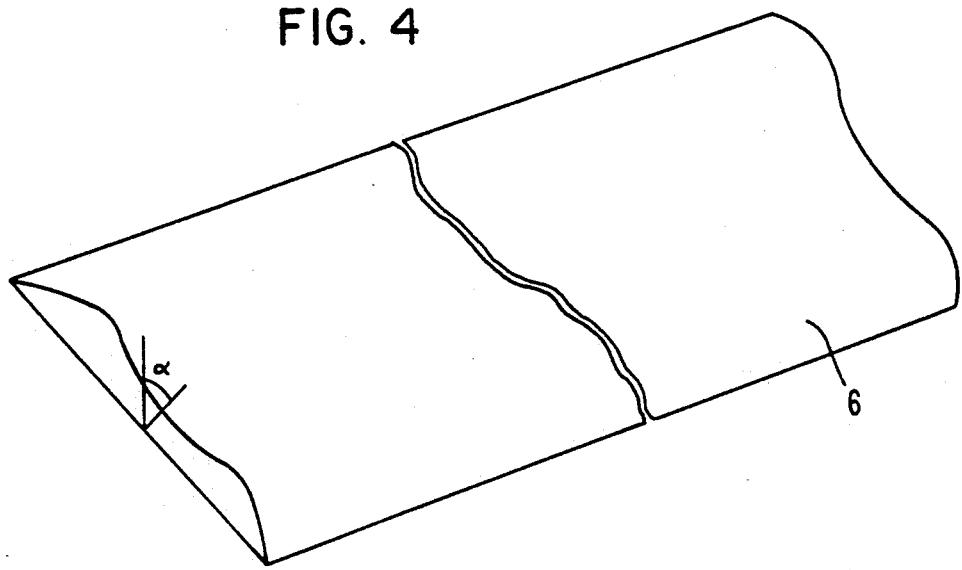
FIG. 4 is a perspective view of a tread element.
Figure 5:
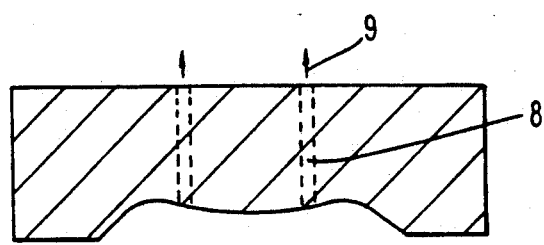
FIG. 5 is a sectional view of the upper injection mold.

As described above, the instant invention is characterized by the fact that cutting angles(α) of both ends of the tread as shown in FIG. 4 and formed by injection molding as described, can be changed (controlled) optionally by selection of the shapes of molds 13,14 to expand the area joining both ends of the tread in the second molding step of the conventional tire-making process thereby enhancing adhesive force where the ends meet.

Figure 6A:
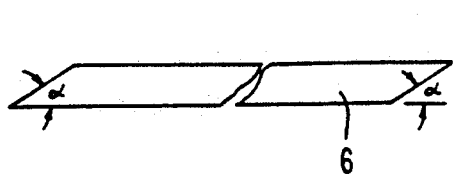
FIG. 6(a) is a lateral view of a tread element in which both ends of the tread are cut on a bias angle "a".
Figure 6B:
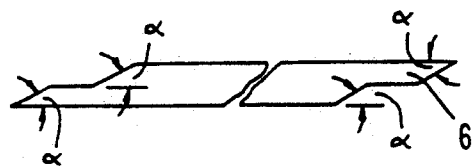
FIG. 6(b) is a lateral view of a tread element in which both ends of the tread are cut in form of a stage.

In addition, both ends of the tread element, through injection molding of the instant invention, can consist of the form of a step, as shown in FIG. 6(b), which greatly expands the joint area of the tread ends.

Furthermore, the method for manufacturing a tread by injection molding in accordance with the instant invention can improve unifomity and balance of the tire remarkably because the tread element molded by this method has a much higher uniformity in longitudinal section and weight distribution during the second molding step of forming a green tire case than that manufactured by conventional extrusion molding.

Also, since the breaker layer(7) and the tread layer(15) are assembled to each other in the injection mold in a single step, the manufacturing process of the tire will be simplified, thereby the manufacturing can be simplified and automated.

In conclusion, the present invention is a useful invention eliminating known defects of tire non-uniformity and in balance otherwise which make it difficult to maintain exact sectional shape and length caused by special viscosity and rubber elasticity problems encountered in the prior art extrusion molding procedure.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A method for forming only a tread element, to be used in assembly with other elements to form a green tire case, comprising the steps of:
   providing an inflatable cylindrical drum which can be inflated to provide an outer surface of a predetermined first diameter "D" about a drum axis;
   assembling a circular mold by moving first and second annular cylindrical mold sections toward each other and toward the outer surface and the axis of the cylindrical drum to form a cavity around the cylindrical drum, said first and second mold sections each having respective arcuate surfaces of said first diameter "D" to fit sealingly to said outer surface of the cylindrical drum to define said cavity therearound, each mold section also having respective injection holes to enable injection of a pressurized rubber mixture therethrough into said cavity and an inside surface of predetermined shape and size and communicating with said respective injection holes, said cavity thereby defining a molding space for molding a quantity of said pressurized injected rubber mixture to form a tread element of predetermined cross-section and length.

2. The method according to claim 1, comprising the further step of:
   disposing on the outer surface of the cylindrical drum a breaker layer of a selected material and structure prior to assembly of said first and second mold sections toward said outer surface to define said molding space in a manner surrounding the breaker layer, whereby injection of said pressurized rubber mixture causes the same to bond to said breaker layer.

3. The method according to claim 2, wherein:
   said step of disposing said breaker layer comprises the further step of first adhering said breaker layer to said outer surface of the cylindrical drum.

4. The method according to claim 1, wherein:
   said first and second mold sections cooperate with each other and with said outer surface of the cylindrical drum to enable molding of a circular tread element from said quantity of said injected pressurized rubber mixture.

5. The method according to claim 1, wherein:
   said first and second mold sections cooperate with each other and with said outer surface of the cylindrical drum to enable molding of a circular tread element from said quantity of said injected pressurized rubber mixture.

6. The method according to claim 3, wherein:
   said first and second mold sections cooperate with each other and with said outer surface of the cylindrical drum to enable molding of a circular tread element from said quantity of said injected pressurized rubber mixture.

7. The method according to claim 1, wherein:
   said first and second mold sections cooperate with each other and with said outer surface of the cylindrical drum to enable molding of a linear tread element of predetermined length from said quantity of said injected pressurized rubber mixture.

8. The method according to claim 2, wherein:
   said first and second mold sections cooperate with each other and with said outer surface of the cylindrical drum to enable molding of a linear tread element of predetermined length from said quantity of said injected pressurized rubber mixture.

9. The method according to claim 3, wherein:
   said first and second mold sections cooperate with each other and with said outer surface of the cylindrical drum to enable molding of a linear tread element of predetermined length from said quantity of said injected pressurized rubber mixture.

10. The method according to claim 7, wherein:
    said inside surfaces of said cooperating first and second mold sections are shaped so as to form said linear tread element to have opposite end surfaces each inclined at a predetermined angle to provide a strong bond upon said end surfaces being adhered to each other to form said linear tread element into a circular shape.

11. The method according to claim 8, wherein:
    said inside surfaces of said cooperating first and second mold sections are shaped so as to form said linear tread element to have opposite end surfaces each inclined at a predetermined angle to provide a strong bond upon said end surfaces being adhered to each other to form said linear tread element into a circular shape.

12. The method according to claim 9, wherein:
    said inside surfaces of said cooperating first and second mold sections are shaped so as to form said linear tread element to have opposite end surfaces each inclined at a predetermined angle to provide a strong bond upon said end surfaces being adhered to each other to form said linear tread element into a circular shape.

13. The method according to claim 10, wherein:
    said inside surface of said cooperating first and second mold sections are also shaped so as to form portions of said linear tread element adjacent said inclined end surfaces in the form of matchingly sized steps.

14. The method according to claim 11, wherein:
    said inside surface of said cooperating first and second mold sections are also shaped so as to form portions of said linear tread element adjacent said inclined end surfaces in the form of matchingly sized steps.

15. The method according to claim 12, wherein:
    said inside surface of said cooperating first and second mold sections are also shaped so as to form portions of said linear tread element adjacent said inclined end surfaces in the form of matchingly sized steps.

* * * * *